(12) United States Patent
Rousseau et al.

(10) Patent No.: US 10,317,703 B2
(45) Date of Patent: Jun. 11, 2019

(54) MANAGEMENT SYSTEM AND METHOD OF AN ACTIVE LENS

(71) Applicant: Essilor International, Charenton-le-Pont (FR)

(72) Inventors: Denis Rousseau, Charenton-le-Pont (FR); Coralie Barrau, Charenton-le-Pont (FR); Denis Cohen Tannoudji, Charenton-le-Pont (FR); Stephane Perrot, Charenton-le-Pont (FR); Aude Bouchier, Charenton-le-Pont (FR); Jean-Paul Cano, Charenton-le-Pont (FR); Claudine Biver, Charenton-le-Pont (FR); Samuel Archambeau, Charenton-le-Pont (FR); Jerome Ballet, Charenton-le-Pont (FR); David Escaich, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/540,995

(22) PCT Filed: Dec. 23, 2015

(86) PCT No.: PCT/EP2015/081202
§ 371 (c)(1),
(2) Date: Jun. 29, 2017

(87) PCT Pub. No.: WO2016/107813
PCT Pub. Date: Jul. 7, 2016

(65) Prior Publication Data
US 2017/0357107 A1    Dec. 14, 2017

(30) Foreign Application Priority Data
Dec. 30, 2014    (EP) ..................... 14307205

(51) Int. Cl.
*G02C 7/02* (2006.01)
*G02C 7/10* (2006.01)
*G02C 7/12* (2006.01)

(52) U.S. Cl.
CPC ............... *G02C 7/101* (2013.01); *G02C 7/02* (2013.01); *G02C 7/104* (2013.01); *G02C 7/12* (2013.01)

(58) Field of Classification Search
CPC . G02C 7/02; G02C 7/04; G02C 7/101; G02C 7/104; G03B 3/00
(Continued)

(56) References Cited

U.S. PATENT DOCUMENTS

2003/0231293 A1   12/2003   Blum et al.
2010/0277687 A1   11/2010   Shehadeh et al.
(Continued)

FOREIGN PATENT DOCUMENTS

| EP | 2631706 A2 | 8/2013 |
|---|---|---|
| EP | 2778752 A2 | 9/2014 |
| KR | 20130091881 A | 8/2013 |

OTHER PUBLICATIONS

ISR/WO for International Appln. No. PCT/EP2015/081202; dated Apr. 1, 2016.

*Primary Examiner* — Darryl J Collins
(74) *Attorney, Agent, or Firm* — Oblon, McClelland, Maier & Neustadt, L.L.P.

(57) ABSTRACT

The invention relates to the field of management of an active lens and more particularly to a management system comprising an active lens (1), a first sensor (2) arranged to measure data relating to an incident light on the active lens, a control unit (4) designed for controlling the active lens according to data measured by the first sensor, wherein the management system further comprises a second sensor (3) arranged to measure data relating to a light transmitted from
(Continued)

Figure 1:
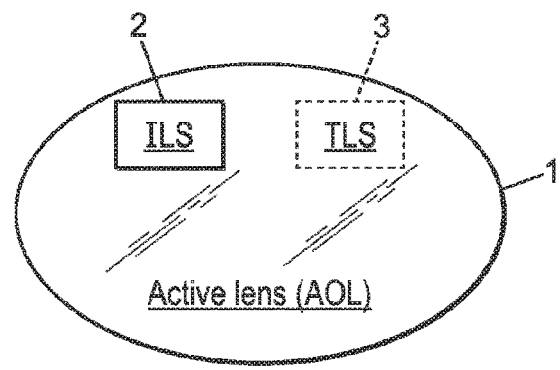

the incident light through the active lens, the control unit being further designed to adjust, according to said data measured by the second sensor, the control already performed according to said data measured by the first sensor. Thus the management system allows taking into account data relating to the light passing through the active lens as a feedback in order to finely control the active lens.

19 Claims, 5 Drawing Sheets

(58) Field of Classification Search
USPC ............ 351/44, 49, 159.03, 159.39, 159.73; 359/642, 809
See application file for complete search history.

(56) References Cited

U.S. PATENT DOCUMENTS

| | | | |
|---|---|---|---|
| 2012/0140167 A1* | 6/2012 | Blum ................... | A61F 2/1624 351/159.34 |
| 2012/0215291 A1* | 8/2012 | Pugh .................... | A61M 21/02 607/93 |
| 2015/0323795 A1* | 11/2015 | Alton ................ | G02B 27/0172 349/11 |
| 2016/0070105 A1* | 3/2016 | Tannoudiji ........... | G02B 27/017 345/8 |

* cited by examiner

MANAGEMENT SYSTEM AND METHOD OF AN ACTIVE LENS

The invention relates to the field of management of an active lens.

The invention relates more particularly to a management system of an active lens, the management system comprising an active lens, a sensor and a control unit designed for controlling the active ophthalmic lens according to data measured by the sensor.

Such a management system, wherein the active lens is an active ophthalmic lens, is known from patent application US 2010/0277687 A1.

A drawback of the management system according to the above-referred patent application is that it does not allow a sufficiently fine control of the active ophthalmic lens, notably in order to fully respond to special requirements of wearer.

In this context, the present invention provides a management system and method to overcome at least the above-mentioned drawback.

To this end, the management system of the invention comprises:
 an active lens,
 a first sensor arranged to measure data relating to an incident light on the active lens or a first light source arranged to provide data relating to an incident light on the active lens,
 a second sensor arranged to measure data relating to a light transmitted from the incident light through the active lens, and
 a control unit designed for controlling the active lens at least according to said measured and/or provided data.

The management system thus allows taking into account data relating to the light coming from the incident light passing through the active lens in controlling the active lens.

When the active lens is an active ophthalmic lens, the management system is notably capable to take into account a large diversity of wearer's ophthalmic requirements, for instance on medical purposes.

According to a particular embodiment, the control unit is designed for:
 controlling the active lens at least according to said data measured by the first sensor or provided by the first light source, and
 adjusting, according to said data measured by the second sensor, the control already performed according to said data measured by the first sensor or provided by the first light source.

Thus the management system further allows taking into account data relating to the light coming from the incident light and passing through the active lens as a feedback in order to finely control the active lens.

Other embodiments, introduced below, take advantage of the operative feedback to allow fine control of the active lens in order to respond to particular encountered requirements, such as for instance particular deficiency, disease or injury of wearer's eye. These embodiments may be combined with each other for instance in order to respond to any kind of accumulated requirements.

According to a first embodiment of this kind, the active lens is an active ophthalmic lens and the management system further comprises:
 a distance sensor arranged to measure the distance from the active ophthalmic lens to an object to be viewed through the active ophthalmic lens and/or
 an actimetry sensor arranged to measure data relating to an activity of a wearer of the active ophthalmic lens,
in order for the control unit to take into account at least one of these supplementary measured data in controlling the active ophthalmic lens.

According to a second embodiment, the active lens comprises an optical filter for filtering harmful and/or chronobiological blue light and each of the first and second sensors comprises harmful and/or chronobiological blue light sensor, respectively.

The management system thus allows a fine and stabilized control of the efficiency and selectivity of the active lens for filtering of harmful or chronobiological blue light as a function of the light environment and/or as a function of the time of day.

According to a third embodiment:
 the active lens comprises one or more optical filters for filtering, partially or totally, one or more wavelengths of the visible spectrum,
 the first sensor comprises a light sensor, designed for measuring data relating to spectral distribution and/or energetic power of the incident light, and
 the second sensor comprises a light sensor, designed for measuring data relating to spectral distribution and/or energetic power of the transmitted light through the active lens.

Indeed, if a specific wavelength or wavelength combination is detected by the first sensor, the active lens may be activated and thus partially or totally filter out this wavelength or wavelength combination. The second sensor ensures the proper functioning and adjusts the filtering efficacy and/or selectivity if needed. The management system thus allows notably a contrast difference of the transmitted light within the viewed scene according to the spectral distribution of the colors of a scene to be viewed through the active lens. When the active lens is an active ophthalmic lens, such a contrast difference is particularly adapted to colorblind people.

According to a fourth embodiment:
 the active lens comprises one or more polarizers for selecting light of specific polarization(s) of the incident light,
 the first sensor comprises a camera designed for capturing a first image as said data relating to the incident light on the active lens, and
 the second sensor comprises a camera designed for capturing a second image as said data relating to a light transmitted from the incident light through the active lens,
 the control unit being designed for comparing the first and second images with each other and controlling the active lens at least according to a result of said comparison.

The management system thus allows detecting of devices emitting polarized light, then allows adapting the selection of polarization(s) performed by the active lens.

According to a fifth embodiment, the active lens is an active ophthalmic lens and:
 the active ophthalmic lens comprises at least one chronobiological light source oriented towards a wearer's eye, and
 each of the first and second sensors comprises a wavelength sensor arranged to measure data relating to an amount of chronobiological light over a period of time.

The management system thus allows a personalized and optimized management of chronobiological light through a continuous control of the quantity and spectrum of chronobiological light received by the wearer, for instance as a function of his/her activity, the time of day, the geolocation and/or some personal parameters. This embodiment is particularly suitable in the context of a chronobiological treatment by light therapy.

The present invention relates also to an eyewear comprising the above described management system, wherein the active lens (1) is an active ophthalmic lens.

The present invention relates also to an active lens, comprising at least:
- a first sensor on a first face of the active lens and arranged to measure data relating to an incident light on the active lens or a first light source on a first face of the active lens and arranged to provide data relating to an incident light on the active lens, and
- a second sensor on a second face of the active lens, opposite to said first face, and arranged to measure data relating to a light transmitted from the incident light through the active lens The present invention further relates also to a management method associated with the here above described management system.

The present invention relates furthermore to a computer program product stored on storage medium and executable by processing means of the above described management system, this computer program product having a sequence of instructions for implementing said associated management method.

The here above described advantages achieved owing to the technical features of the here above described management system are also achieved owing to the other aspects of the present invention.

Figure 2:
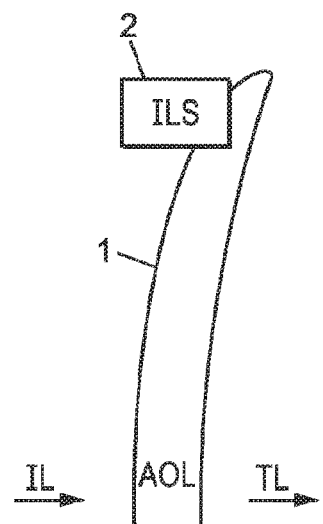
Figure 2:
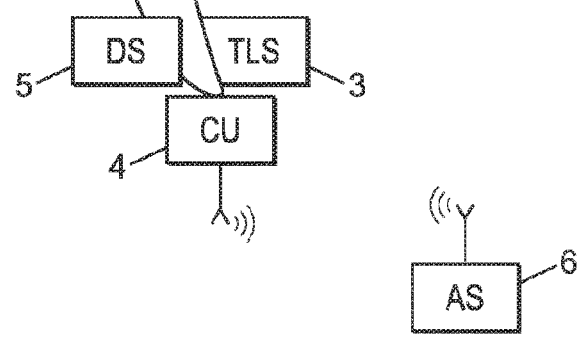
Figure 3:
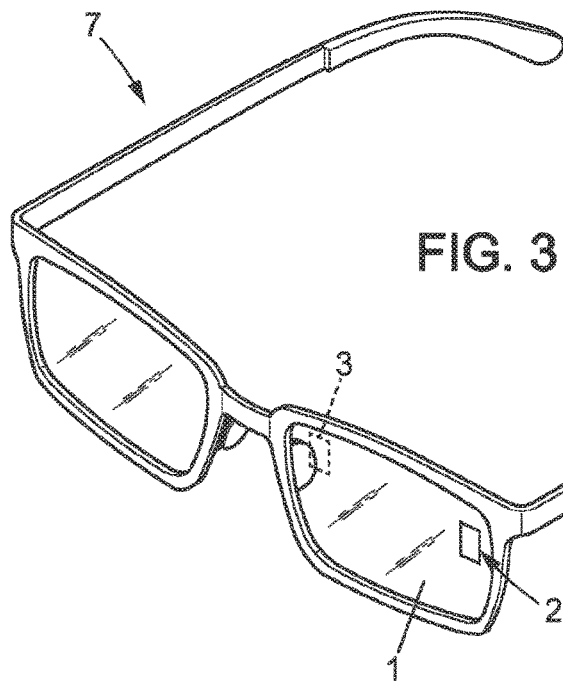
Figure 4:
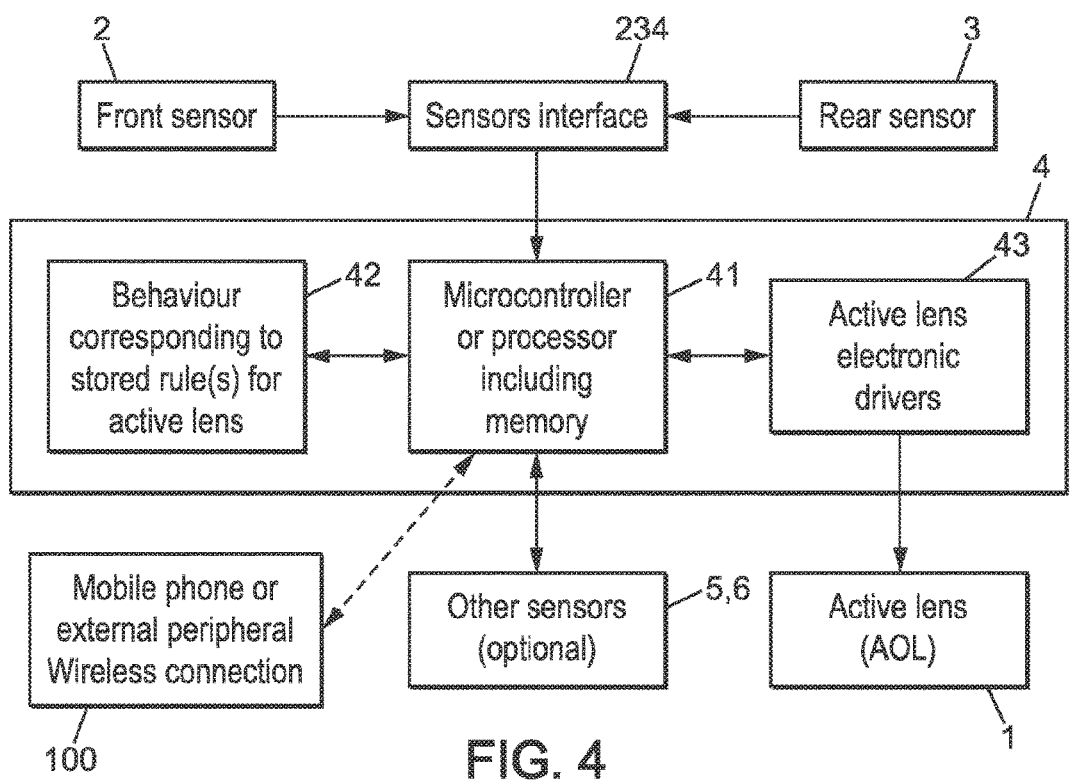
Figure 5:
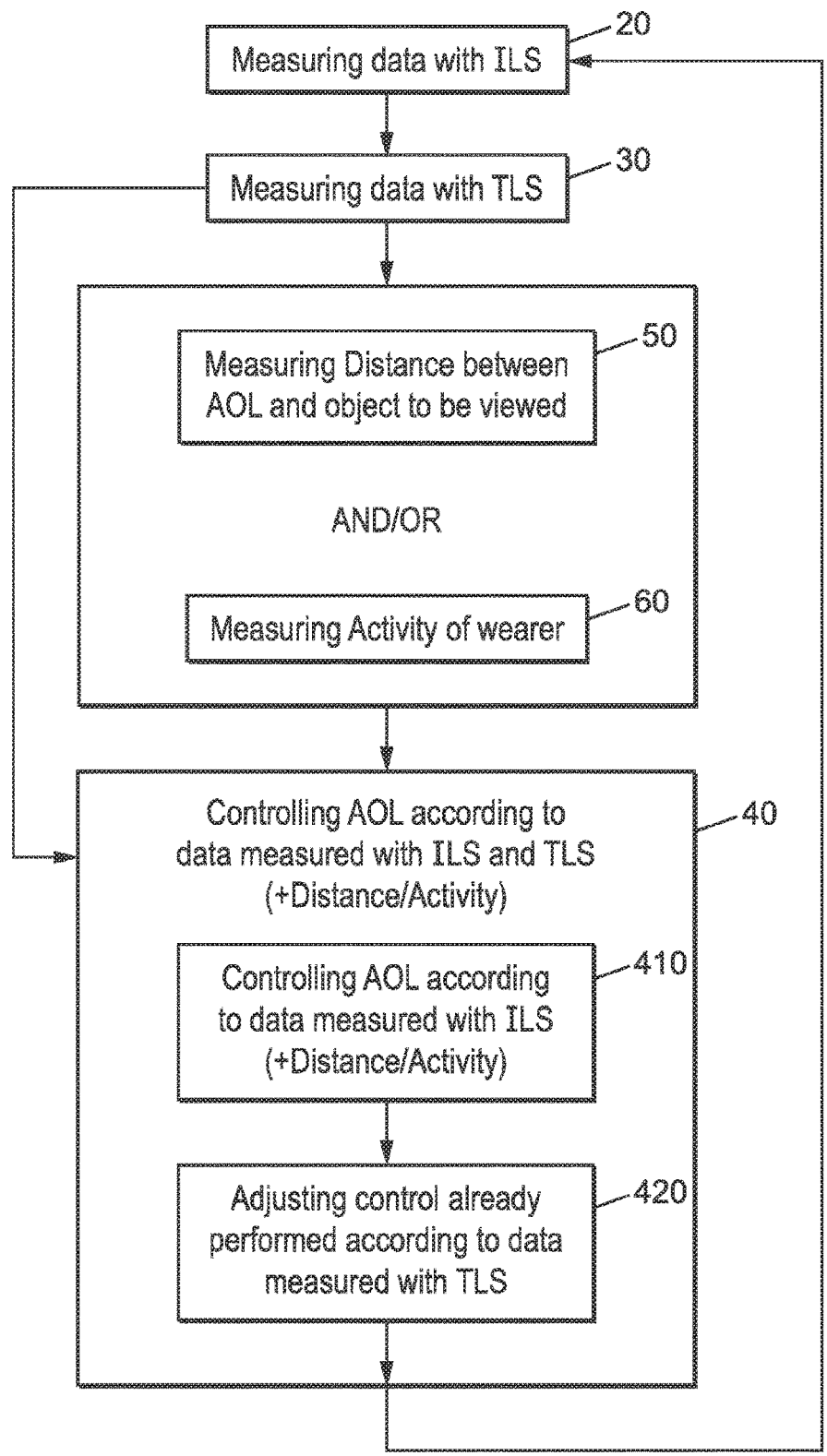
Figure 6:
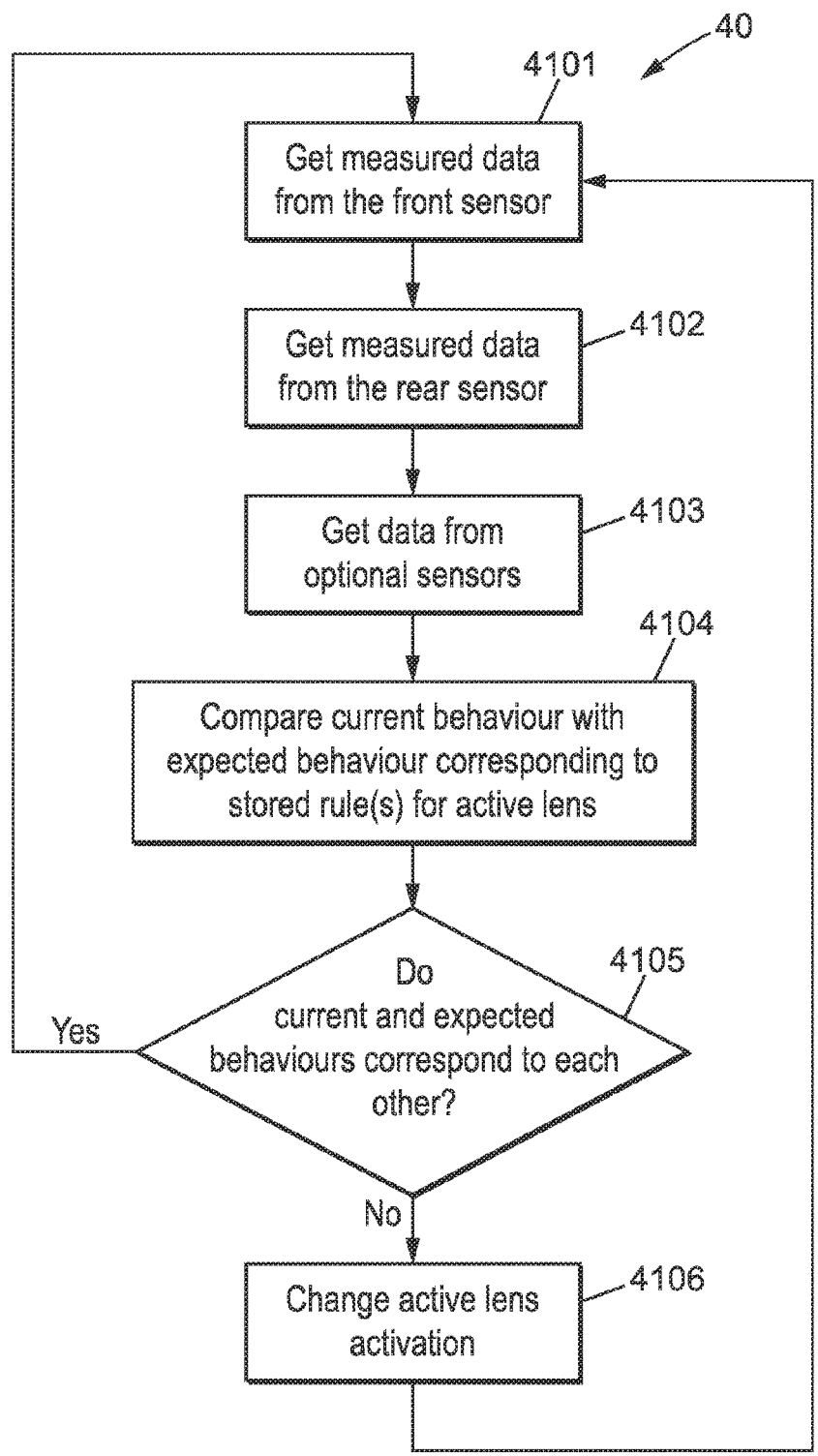
Figure 7:
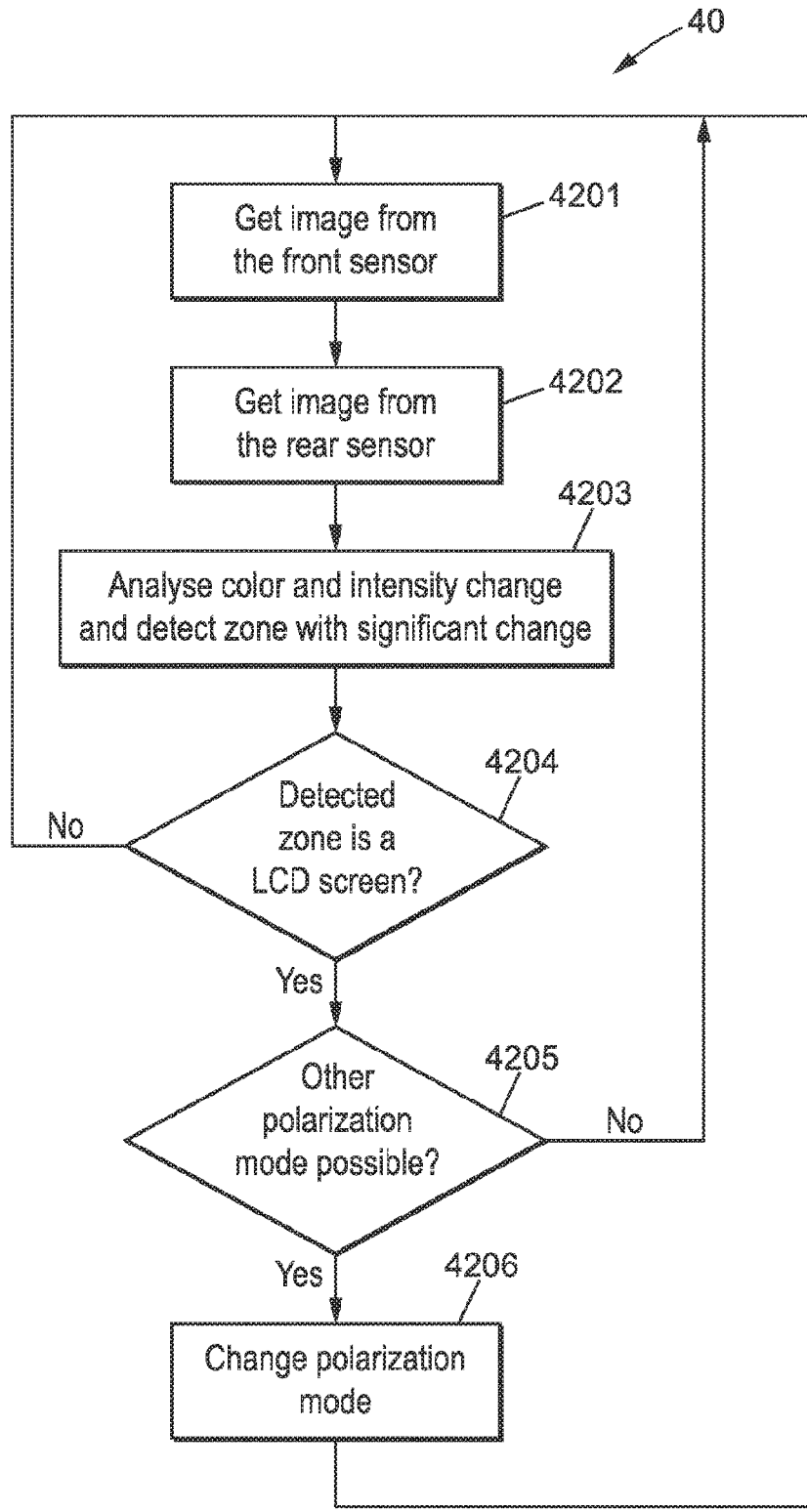

Other technical features or advantages of the present invention will clearly stand out from the detailed description which is done below, by way of example and for purposes of illustrative discussion of embodiments of the invention, with specific reference to the accompanying drawings, in which:

FIG. 1 is a schematic front view of a first embodiment of an active lens of the management system according to the present invention, FIG. 2 is a schematic sectional view of a second embodiment of an active lens of the management system according to the present invention, FIG. 3 is a perspective view of an eyewear comprising an embodiment of the management system according to the present invention, FIG. 4 shows a hardware synoptic of an embodiment of the management system according to the present invention, FIG. 5 shows a flowchart for an embodiment of the management method according to the present invention, FIG. 6 shows a flowchart for an embodiment of the controlling step of the management method according to the present invention, and FIG. 7 shows a flowchart for an embodiment of the controlling step of a sixth embodiment of the management method according to the present invention.

The present invention may be helpful for any wearer of spectacles equipped with an active lens 1, which can change state according to the environment or a manual or automatic control. Nevertheless, an active lens does not be regarded as limited to an active ophthalmic lens. Indeed, an active lens as considered in the present invention may encompass lenses of spectacles which do not have any kind of therapeutic effect, like eyeshade or sunshade.

The operating mode of such active lenses may be completely predefined if the active lens has a simple function. For instance, an electrochromic lens may obey an on/off order given by the wearer.

Nonetheless, and notably in accordance with the present invention, the operating mode of such active lenses may be adapted to a setting, notably if several simultaneously active lenses (eg electrochromic and polarizer) are used, and/or depending on the time of day and/or the type of activity (sport, study, reading, domestic activity . . . ).

Referring to FIG. 4, an embodiment of the management system according to the present invention may comprise:
- an active lens 1, or more particularly an active ophthalmic lens (AOL),
- a first sensor 2 arranged to measure data relating to an incident light on the active lens 1,
- a second sensor 3 arranged to measure data relating to a light transmitted from the incident light through the active lens 1, and
- a control unit 4 designed for controlling the active lens 1 at least according to said measured data.

An ophthalmic lens can be a corrective lens, a non corrective lens, solar lens and/or tinted lens.

There are different kinds of active lenses. They generally change their behavior according to an external order. For instance, the active lens 1 may be an electrochromic lens. An active lens 1 may be controlled by electrical activation.

The active lens 1 may comprise several layers corresponding to several functions. These functions may comprise:
- a change in optical power, for example with a soft lens or a liquid crystal system, to provide distance or near vision depending on the circumstances,
- a phase change, for example with the polarizers, to provide a polarization of incident light,
- a spectral change, for example a blue light blocking filter,
- a change in intensity, for example with an electrochromic effect, to adapt the intensity of the light flux reaching the eye, for example to better visualize a screen placed in front of the eye for virtual reality applications, and
- a light generation, for example with a screen or a simple source of light, for applications of light therapy, to deliver on the eye a low intensity light for therapeutic purposes.

Referring to FIGS. 1 and 2, the first sensor 2 may be positioned outwardly to see the real scene without alteration by the active lens. The first sensor 2 may thus be called an incident light sensor (ILS). It measures data relating to the incident light on the active lens 1. It may also be called, here below or on the attached drawings, the front sensor. Nonetheless, it may be disposed directly on the front face of the active lens as well as accommodated in the active lens. The first sensor 2 may also be moved and connected to an end of an optical waveguide, the other end of said optical waveguide being positioned outwardly to transmit light or image of the real scene without alteration by the active lens.

Referring to FIGS. 1 and 2, the second sensor 3 may be arranged behind the active lens 2. It analyses the light or image after transmission through the active lens. The second sensor may be thus called a transmitted light sensor (TLS). It measures data relating to the light flux or the image which may be sensed through the active lens. When positioned at the rear of the active lens, it may be called the rear sensor, as this could be the case notably here below or on the attached drawings. The second sensor 3 partially simulates the wearer's eye. Its biomimetic may relate to at least one among the ametropia, the sensitivity to light, the risk of retinal phototoxicity and the need for chronobiological light depending on the activity, the time of day and the geolocation. When the active lens is an active ophthalmic lens, the rear sensor can be optically tuned to fit the wearer's view, for example myopic or hypermetropic, in order to facilitate image or light detection for further activation of the active lens. The second sensor 3 may also be moved and connected to an end of an optical waveguide, the other end of said optical waveguide being arranged behind the active lens 1 to transmit light or image sensed through the active lens.

When the active lens 1 is an active ophthalmic lens (AOL), each sensor may be placed on the frame of eyewear (or spectacles), closed to the wearer eyes. When an optical waveguide is further used, a sensor 2, 3 may be placed on the sidepiece (or bow) of the eyewear.

The first and/or second sensors 2, 3 may be camera(s), or more specialized sensor(s), for example for accurately detecting a light intensity or a wavelength to be eliminated. More particularly, each sensor may be:
- one or several photodiodes, each with a specific bandwidth allowing the detection of particular light frequency, and/or
- a camera for complete scene analysis or special object detection, like high luminance object, or polarized light source, The first and second sensors 2, 3 are connected to an electronic device called control unit 4 that is designed for analyzing the measured data, and for driving the active lens 1 with a particular method, that is for instance a method adapted to the wearer and/or to the image modification allowed by the active lens 1. This may be a wired or wireless connection. This connection may further involve a sensor interface 234, as illustrated on FIG. 4. The sensors interface may be part of the control unit 4.

The control unit 4 allows, from a database and a preliminary program, to enslave the operation of the active lens 1 in function of the light flux received by the eye and regarding the chosen function(s) of the active lens. The control unit 4 is designed for controlling the active lens 1 at least according to data measured by the first and second sensors 2, 3. The control unit 4 is more particularly designed for:
- controlling the active lens 1 at least according to data measured by the first sensor 2, and
- adjusting, according to data measured by the second sensor 3, the control already performed according to said data measured by the first sensor 2.

As illustrated on FIG. 3, the first and second sensors 2, 3 may be placed on the active lens 1 and connected to the control unit 4 arranged on the sidepiece of the eyewear.

In an embodiment, the first and second sensors 2, 3 may be placed in a row arrangement, i.e. are aligned on the active lens.

As illustrated on FIG. 4, the control unit 4 may comprise processing means 41. These latter are not detailed, but may be any of common components used to design electronic systems, such as for example STM32 or Kinetis microcontroller or iMX6 processor. The control unit 4 may also comprise interfacing means 234, 43. For instance, a sensor interface 234 may allow to functionally interface the first and second sensors 2, 3. For another example, active lens electronic driver(s) 43 may allow driving the activation of the active lens 1, for instance by delivering suitable electrical signal(s) to the active lens. The interfacing means 234, 43 are not detailed, but may be any of common interfaces used to design electronic systems, such as for example I²C bus, Mipi interface, or any wired or wireless communication between components. The control unit 4 may further comprise data storing means 42, for instance for storing said preliminary program, measured and/or collected data and pas and actual state of the active lens 1 (polarizer on/off, filter on/off, quantity of chronobiological light passing through the active lens during last hours, . . . ). These latter are not detailed, but may be any of common non-transitory storage medium used to design electronic systems, such as for example SRAM memory, Flash memory, etc. The control unit 4 may further comprise supplementary sensors 5, 6 or be communicatively connected to such supplementary sensors 5, 6, with these latters being or not comprised in some external devices 100. The supplementary sensors 5, 6 are not detailed, but may be any kind of touch sensors, pressure sensors, light sensors, temperature sensors, chronometers, GPS position sensors, displacement sensors, accelerometers, gyroscopes, magnetometers, distance sensors DS (5) or actimetry sensors AS (6). Thus, in particular embodiments, a displacement sensor may be used to automatically detect an activity (walking, running, standing or sitting . . . ); a distance sensor may be used to control the variation power of a soft lens as a function of an object placed in front of the field of vision. Other sensors (temperature, blood pressure, eye movements by electrooculography or eye tracking with a camera . . . ) may be used in several medical applications.

Wireless connection of the control unit 4 to an external processor 100 is also possible; thus the management of the active lens 1 may be made by the use of the external processor 100 and the control unit 4 advantageously needs less processing resources. The decision and way to activate the active lens 1 may be determined locally (on or near the active lens 1) or remotely (on the external device).

As illustrated on FIG. 4, said external devices or external processors 100 may comprise a mobile phone, a smartphone, a control pad, a iPad or a graphics pad. These devices or processors may get supplementary information about the environment of the active lens 1 and, if appropriate, the wearer (activity, health test, agenda . . . ), in order for the control unit 4 to take into account at least one of these supplementary information or measured data in controlling the active lens.

Wireless connection of the control unit 4 to the Internet is also possible, for instance via the external devices 100. In such a case, regulation may be done with information about the wearer and his environment coming from the internet, and the management of the active lens 1 may be determined by a remote controller comprised in an Internet server.

The management method according to several embodiments of the present invention is more particularly described here below with references to FIGS. 5 to 7.

As illustrated on FIG. 5, the management method comprises, in its broader sense, the steps consisting in:
- measuring data 20 relating to the incident light on the active lens 1 with the first sensor 2 being arranged thereto,
- measuring data 30 relating to the light transmitted from the incident light through the active lens 1, with the second sensor 3 being arranged thereto, and
- controlling 40 the active lens 1 at least according to the measured data, with the control unit 4 being designed therefor.

The controlling step 40 may more particularly consists in:
- controlling 410 the active lens 1 at least according to said data measured by the first sensor 2, then
- adjusting 420, according to said data measured by the second sensor 3, the control already performed according to said data measured by the first sensor 2.

With the active lens 1 being an active ophthalmic lens (AOL), the management method according to a first embodiment may further comprise, before, on or after each of the measuring steps 20 and 30:

measuring a distance 50 from the active ophthalmic lens to an object to be viewed through the active ophthalmic lens, with the distance sensor 5 provided therefor, and/or measuring data 60 relating to an activity of the wearer of the active ophthalmic lens, with the actimetry sensor 6 being provided therefor, in order for the controlling step 40, 410 to be implemented by taking into account at least one of these supplementary measured data.

As illustrated on FIG. 6, the controlling step 40, 410 may more particularly comprise:

getting 4101 measured data from the front sensor 2,
getting 4102 measured data from the rear sensor 3,
getting 4103 data from optional sensors 5, 6.

Each set of gathered data may determine an expected behavior of the active lens 1 according to some predefined behavioral rules stored in the storing means 42 and implemented by the processing means 41. The current state or behavior of the active lens 1 may either be already known and stored in the storing means 42 or be determined by the control unit 4, for instance by testing of the active lens electronic driver(s) 43. The expected behavior may be compared to the current one 4104. If 4105 the expected behavior is the same than the current one, no change in the activation of the active lens 1 will be ordered. On the contrary, if 4105 the expected behavior is different from the current one, the control unit 4 will control 40 the active lens in order to bring it in the expected state 4106. In order to achieve this, the control unit 4 may implement the preliminary program stored in the storing means 42 to 'translate' the difference between the current state and the expected state in order(s) used by the active lens electronic driver(s) 43 to send suitable electrical signal(s) and change 4106 the state of the active lens 1.

In an alternative embodiment, the management system and the related management method are similar than the ones previously described except for the following differences:

The first sensor is suppressed and replaced by a first light source arranged to provide data relating to an incident light on the active lens.

The first light source is oriented towards the eye.

The first light source may be a LED.

The four following embodiments describe below may be implemented using the method according to the invention. The here above described management system may be used to control an active and fine control of visual and/or non-visual functions regulated by the interaction between the wearer's eye and the light.

According to a first embodiment of the management method, there is provided an active and controlled filtering of harmful blue depending on the light environment.

The active lens 1 is an active spectral filter which rejects harmful blue light, that is to say light of wavelengths comprised between 400 nm and 465 nm, preferably between 415 nm and 455 nm. These wavelengths are involved in the progressive degeneration of cells in the retinal pigment epithelium (RPE), and by extension chronic exposure to these wavelengths is a risk factor in the onset of age-related macular degeneration (AMD). The active filter is constituted for example of cholesteric phase liquid crystal introduced into a cell formed by two substrates made in mineral lens or in optically transparent plastic. One or both of the substrates bear transparent conductive electrodes. These electrodes are used to apply an electric field which varies the orientation of the liquid crystals, thus changing the profile of the spectral filter (selectivity and efficiency).

The front sensor 2 is a level sensor of the exposure to harmful blue light. It may more particularly be a luxmeter calibrated on a blue LED or a photodiode sensitive to harmful blue light for example. The rear sensor 3 detects the level of exposure to harmful blue after filtering by the active filter lens 1. The combination of the two sensors on the front and rear allows to:

finely control the efficiency and selectivity of the filter as a function of time and recognize the wearing time of the filtering device.

In an alternative embodiment, the front sensor 2 is replaced by a blue Led.

Furthermore, the active spectral filter of harmful blue light may be activated only when harmful blue light is detected by at least one of the front and rear sensors 2, 3, in order to reduce glare.

According to a second embodiment of the management method, there is provided an active and regulated filtering of chronobiological blue light depending on the luminous environment and/or on the time of day and/or geolocation.

The active lens 1 is an active spectral filter which rejects chronobiological blue light, that is to say light of wavelengths comprised between 465 nm and 520 nm, preferably between 465 nm and 495 nm. These wavelengths, absorbed by intrinsically photosensitive retinal ganglion cells (ipRGC) are involved in regulating many non-visual biological functions, including the sleep-wake cycle, pupillary reflex, cognition, mood, body temperature . . . .

Suitable modulation of light between 465 nm and 495 nm is essential for proper synchronization of chronobiological rhythms. The active filter is constituted for example of cholesteric phase liquid crystal introduced into a cell formed by two substrates made in mineral lens or optically transparent plastic. One or both of the substrates bear transparent conductive electrodes. These electrodes are used to apply an electric field which varies the orientation of the liquid crystals, thus changing the profile of the spectral filter.

The front sensor 2 is a level sensor of the exposure to chronobiological blue light. It may more particularly be a luxmeter calibrated on a blue turquoise LED or a photodiode sensitive to harmful blue light for example.

In an alternative embodiment, the front sensor 2 is replaced by a blue LED.

The rear sensor 3 detects the level of exposure to chronobiological blue light after filtering by the active lens 1.

The closed loop control provides:

finer and more stable control over time of spectral filtering function of the active lens and precise control of time port of the filtering device.

According to a third embodiment of the management method, there is provided a light therapy application by suitably enriching received chronobiological light in function of the light environment, the time of day, the activity or the geolocation.

The active lens 1 comprises a light source of selective emission such as the blue-turquoise chronobiological light (around 480 nm, this latter value being the center of chronobiological band in the blue-turquoise) or the near-green chronobiological light (around 500 nm). The light source is facing the wearer's eye and preferably does not interfere with vision. The light source comprises for instance one or more LEDs. The use of green monochromatic LED centered around 500 nm has several advantages:

an improvement of energy efficiency compared to blue-turquoise LED,
a green spectral range not associated with retinal phototoxicity mechanisms, and
a less energetic wavelength.

The front sensor 2 measures exposure level to chronobiological light. In accordance with a determined brightness threshold, to be associated with an individual profile and/or an individual activity and/or the time of day, the sensor controls the activation of the light source.

The rear sensor 3 controls the light source and finely adjusts level if necessary.

According to a fourth embodiment of the management method, there is provided a contrast difference for color-blind according to the spectral distribution of the colors of a viewed scene.

The active lens 1 may be one or an overlay of active spectral filter(s) allowing to partially or totally cut one or more selective wavelength bands in the visible range, depending on the type of color blindness and its severity.

The active spectral filters comprise for example controllable cholesteric liquid crystal such as according to the first and second embodiments described here above.

The front sensor 2 is a light sensor, for instance a camera, to measure the spatial distribution colors in a scene, typically the spatial distribution of red and green colors, and/or energetic power of the scene light. This measured spectral distribution and/or energetic power allows controlling the activation of the filtering profile (one or more notch filters).

The rear sensor 3 checks the activation of the filter(s) and finally adjusts the spectral profile sensed by the wearer.

The most common type of dichromacy occurs due to the absence of M (medium, green wavelengths) or L (long, red wavelengths) cone photopigment. It is the red-green axis in the color space that is affected, i.e. hues along the red-green axis appear more as neutral greys. In these cases, if the viewed scene contains different green and red spatial areas, the active lens 1 will be activated thanks to the front sensor 2 and will totally filter out green or red wavelengths. Thus, by contrast difference, one of the two colours will appear totally black, which will allow the dichromatic wearer to see a significant differentiation between green and red and to better understand the scene. The real sensor 3 will check if the contrast difference is activated and will adjust the filtering efficacy and selectivity if needed.

According to a fifth embodiment of the management method, and as illustrated on FIG. 7, there is provided an application particularly suitable for controlling an active ophthalmic lens when the wearer is viewing a device that emits polarized light. Here the active lens 1 may comprise one or more polarizers for selecting light of specific polarization(s) of the incident light.

The first sensor 2 may comprise a camera designed for capturing a first image as said data relating to an incident light on the active lens 1; and the second sensor 3 may comprise a camera designed for capturing a second image as said data relating to a light transmitted from the incident light through the active lens 1.

The control unit (4) is then designed for comparing the first and second images with each other and controlling the active lens 1 at least according to a result of said comparison.

The image comparison is made to detect a device that emits polarized light such as an LCD screen or a polarized light source, and the result may be the deactivation or activation or activation mode change of the polarising lens to enable or disable the view of the polarized light.

The management system thus allows detecting of devices emitting polarized light, then allows adapting the selection of polarization(s) performed by the active lens 1.

As illustrated on FIG. 7, the controlling step 40, 410 according to the fifth embodiment of the management method may more particularly comprise:

getting 4201 image sensed by the camera 2, and
getting 4202 image sensed by the camera 3.

Each set of images may be analyzed 4203 by comparing the one to the other according to some predefined behavioral rules stored in the storing means 42 and implemented by the processing means 41. The images are more particularly analyzed in terms of light color and intensity change(s) and to detect zone(s) of significant change(s). If 4204 no zone of significant change(s) is detected, no change will be brought to the lens activation. On the contrary, if 4204 at least one zone of significant change(s) is detected, the control unit 4 then may determine 4205 whether or not other polarization modes are available. To determine whether or not other polarization modes have to be considered depends not only on the performed image comparison, but may also depend on a desired behavior defined in function of data measured by other sensors, such as sensors 5, 6 for instance, and/or in function of external data. For instance, it can be decided to mask a screen in order to not disturb the visual field of the viewer with not relevant data; on the contrary, it can be decided to make a screen appear to show relevant data. For example, these considerations may be helpful for an aircraft pilot. Then the active lens 1 is controlled 40 accordingly. This controlling step may comprise changing 4206 the polarization mode. Any change of the polarization mode may consist in activating another polarization mode than the one already performed or deactivating the polarization already performed by the active lens 1. The decision on whether a change of polarization mode has to be performed or not and the decision about the change to be performed may also be taken in function of the position of the screen.

The control unit 4 may implement the preliminary program stored in the storing means 42 to 'translate' the result of the performed comparison in order(s) which are dedicated to be used by the active lens electronic driver(s) 43 to send suitable electrical signal(s) to the active lens 1.

Other embodiments may be envisaged which are in the scope of the appendix claims.

For instance, according to an embodiment of the management system, the management system comprises a white LED, serving as a reference light source and a photodetector arranged to measure data relating to a light transmitted from the incident light through the active lens.

Such a management system provides a transmission control of the electrochromic filter to ensure the desired transmission is applied.

The measurement of transmission is compared with a transmission set value, and a PID servo manages torque voltage/current supplied to the active lens to achieve the desired transmission.

Advantageously, such a management system allows to overcome internal and external conditions of the active lens which impact the efficiency of the active lens such as aging problems of the device, weather conditions (temperature) and/or the variation of internal parameters (resistivity ITO, voltage drop, contact losses, etc . . . ).

In another example, the active lens is an electrochromic active lens, user may want to activate the electrochromism in the outdoor, but darken even more if he/she wants to read a message on a screen behind the active lens.

In another embodiment, it is also possible to enable the light therapy method over time, and measure the flux naturally received in order to be able to determine if there is a need to add an additional light source. For another example, in an indoor environment, it may be decided by the management system according to the present invention to cut the polarizer filter to see LCD screens without effect of cross-polarization.

The invention claimed is:

1. A management system of an active lens comprising:
an active lens having a front face and a rear face;
an input interface receiving first data from at least one of:
a first sensor arranged to measure data relating to at least an incident light on the front face of the active lens, and
a first light source applied towards the front face and providing data;
a second sensor arranged to measure second data relating to a light transmitted through the active lens and at the rear face; and
control circuitry configured to control the active lens at least according to the first data, wherein
the control circuitry is further configured to finely adjust, according to said second data, the control previously performed according to the first data.

2. The management system according to claim 1, wherein the active lens is an active ophthalmic lens and wherein the management system further comprises at least one of:
a distance sensor arranged to measure distance from the active ophthalmic lens to an object to be viewed through the active ophthalmic lens; and
an actimetry sensor arranged to measure data relating to an activity of a wearer of the active ophthalmic lens, in order for the control circuitry to take into account at least one of the measured distance from the active ophthalmic lens and the measured data relating to the activity of the wearer while controlling the active ophthalmic lens.

3. The management system according to claim 1, wherein:
the active lens comprises an optical filter for filtering at least one of harmful and/or chronobiological blue light, and
each of the first and second sensors comprises at least one harmful and chronobiological blue light sensor, respectively.

4. The management system according to claim 1, wherein:
the active lens comprises one or more optical filters for filtering partially or totally one or more wavelengths of a visible spectrum,
the first sensor comprises a light sensor designed for measuring data relating to at least one of spectral distribution and energetic power of the incident light, and
the second sensor comprises a light sensor designed for measuring data relating to at least one of the spectral distribution and the energetic power of the light transmitted from the incident light through the active lens.

5. The management system according to claim 1, wherein:
the active lens comprises one or more polarizers for selecting light of at least one specific polarization of the incident light,
the first sensor comprises a camera designed for capturing a first image as said data relating to the incident light on the active lens,
the second sensor comprises a camera designed for capturing a second image as said data relating to the light transmitted from the incident light through the active lens, and
the control circuitry being further configured to
compare the first and second images with each other; and
control the active lens at least according to a result of said comparison.

6. The management system according to claim 1, wherein the active lens is an active ophthalmic lens and wherein:
the active ophthalmic lens comprises at least one chronobiological light source oriented towards a wearer's eye, and
each of the first and second sensors comprises a wavelength sensor arranged to measure data relating to an amount of chronobiological light over a period of time.

7. The management system of claim 1, wherein the management system is a component of an eyewear, and wherein the active lens is an active ophthalmic lens.

8. The management system according to claim 1, wherein the input interface receives first data from both a first sensor arranged to measure data relating to at least an incident light on the front face of the active lens and a first light source applied towards the front face and providing data.

9. An active lens of a management system having a front face and a rear face, and comprising at least:
a first sensor arranged to measure first data relating to at least an incident light on the front face of the active lens; and
a second sensor arranged to measure second data relating to a light transmitted at least from the incident light through the active lens, wherein the system further comprises:
control circuitry that is configured to finely adjust, according to said second data, control previously performed according to the first data.

10. The active lens of claim 9, wherein:
the active lens comprises an optical filter for filtering at least one of harmful and chronobiological blue light, and
each of the first and second sensors comprises at least one harmful and chronobiological blue light sensor.

11. The active lens of claim 9, wherein:
the active lens comprises one or more optical filters for filtering partially or totally one or more wavelengths of a visible spectrum,
the first sensor comprises a light sensor designed for measuring data relating to at least one of spectral distribution and energetic power of the incident light, and
the second sensor comprises a light sensor designed for measuring data relating to at least one of the spectral distribution and the energetic power of the light transmitted from the incident light through the active lens.

12. The active lens of claim 9, wherein:
the active lens comprises one or more polarizers for selecting light of at least one specific polarization of the incident light,
the first sensor comprises a camera designed for capturing a first image as said data relating to the incident light on the active lens, and
the second sensor comprises a camera designed for capturing a second image as said data relating to the light transmitted from the incident light through the active lens.

13. A management method of an active lens comprising:
performing at least one of measuring and providing first data-relating to at least one of an incident light on the active lens with a first sensor, and a first light source, respectively;
measuring second data relating to a light transmitted through the active lens and at the rear face, with a second sensor; and
controlling the active lens at least according to at least one of the measured and provided first data,
wherein the controlling of the active lens further includes finely adjusting, according to said second data, the control previously performed according to said first data.

14. The management method according to claim 13, further comprising, with the active lens being an active ophthalmic lens:
measuring at least one of a distance from the active ophthalmic lens to an object to be viewed through the active ophthalmic lens with a distance sensor and
data relating to an activity of a wearer of the active ophthalmic lens, with an actimetry sensor,
wherein controlling the active lens at least according to at least one of the measured and provided data comprises taking into account at least one of the measured distance and the measured data.

15. The management method according to claim 13, wherein:
measuring the data comprises measuring at least one of harmful and chronobiological blue light, wherein each of the first and second sensors comprises a sensor operable to measure the at least one harmful and chronobiological blue light, and
controlling the active lens comprises filtering at least one of harmful and chronobiological blue light respectively, wherein the active lens comprises an optical filter operable to filter at the at least one of the harmful and the chronobiological blue light.

16. The management method according to claim 13, wherein:
measuring data with the first sensor comprises measuring data relating to at least one of spectral distribution and energetic power of the incident light, wherein the first sensor comprises a light sensor operable to measure data relating to the at least one of the spectral distribution and the energetic power of the incident light,
measuring data with the second sensor comprises measuring data relating to at least one of spectral distribution and energetic power of the transmitted light, wherein the second sensor comprises a light sensor operable to measure data relating to the at least one of the spectral distribution and the energetic power of the transmitted, and
controlling the active lens comprises filtering partially or totally of one or more wavelengths of a visible spectrum, wherein the active lens comprises one or more optical filters operable to partially or totally filter one or more wavelengths of the visible spectrum.

17. The management method according to claim 13, wherein:
the active lens comprises one or more polarizers for selecting light of one or more specific polarizations of the incident light,
measuring data with the first sensor comprises capturing a first image as said data relating to the incident light on the active lens, wherein the first sensor comprises a camera operable to capture the first image
measuring data with the second sensor comprises capturing a second image as said data relating to the light transmitted from the incident light through the active lens, wherein the second sensor comprises a camera operable to capture the second image, and
controlling the active lens comprises controlling the active lens at least according to a result of a comparison between the first and second images, wherein the control unit is operable to comprise said first and second images.

18. The management method according to claim 13, wherein, the active lens is an active ophthalmic lens, and wherein:
measuring data comprises measuring data relating to an amount of chronobiological light over a period of time, wherein each of the first and second sensors comprises a wavelength sensor operable to measure data relating to the amount of chronobiological light over the period of time, and
controlling the active ophthalmic lens comprises emitting chronobiological light towards a wearer's eye, wherein the active ophthalmic lens comprises at least one chronobiological light source operable to emit chronobiological light towards the wearer's eye.

19. A non-transitory computer readable storage medium storing a computer-executable program comprising instructions for performing the method of claim 13.

* * * * *